United States Patent
Kimura et al.

(10) Patent No.: US 12,427,459 B2
(45) Date of Patent: Sep. 30, 2025

(54) AIR FILTER MEDIUM, AIR FILTER PACK, AND AIR FILTER UNIT

(71) Applicant: DAIKIN INDUSTRIES, LTD., Osaka (JP)

(72) Inventors: Takashi Kimura, Osaka (JP); Yoshiyuki Shibuya, Osaka (JP); Satoshi Hara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/883,671

(22) Filed: Sep. 12, 2024

(65) Prior Publication Data

US 2025/0001339 A1    Jan. 2, 2025

Related U.S. Application Data

(63) Continuation of application No. PCT/JP2023/009731, filed on Mar. 13, 2023.

(30) Foreign Application Priority Data

Mar. 15, 2022    (JP) ................................. 2022-040331

(51) Int. Cl.
*B01D 46/00*    (2022.01)
*B01D 39/16*    (2006.01)
(Continued)

(52) U.S. Cl.
CPC ......... *B01D 39/18* (2013.01); *B01D 39/1623* (2013.01); *B01D 46/0001* (2013.01);
(Continued)

(58) Field of Classification Search
CPC .............. B01D 46/523; B01D 46/0005; B01D 2275/10; B32B 5/022; B32B 27/322; B32B 3/30; B32B 3/28; B32B 2307/724
(Continued)

(56) References Cited

U.S. PATENT DOCUMENTS 8,545,589 B2 *  10/2013  Rocklitz .............. B01D 46/525
                                                        210/493.4
8,915,985 B2 *  12/2014  Dewit .................... B01D 46/62
                                                        55/482
(Continued)

FOREIGN PATENT DOCUMENTS

EP    2 657 291 A1    10/2013
EP    3 415 218 A1    12/2018
(Continued)

OTHER PUBLICATIONS

International Search Report for PCT/JP2023/009731 (PCT/ISA/210) mailed on May 16, 2023.
(Continued)

*Primary Examiner* — Minh Chau T Pham
(74) *Attorney, Agent, or Firm* — Birch, Stewart, Kolasch & Birch, LLP

(57) ABSTRACT

An air filter medium includes a resin having a plurality of first convex portions protruding from a first surface of the filter medium in an air flow direction relative to the filter medium and a plurality of second convex portions protruding from a second surface that is a back surface of the first surface of the filter medium in the air flow direction. The total projected area of the plurality of first convex portions and the plurality of second convex portions in a case where an entirety of the filter medium is projected in the air flow direction is 50% or more and 100% or less of a projected area of the entirety of the filter medium in a case where the entirety of the filter medium is projected in the air flow direction.

20 Claims, 6 Drawing Sheets

(51) Int. Cl.
  *B01D 39/18* (2006.01)
  *B01D 46/52* (2006.01)
(52) U.S. Cl.
  CPC ...... *B01D 46/523* (2013.01); *B01D 2239/025* (2013.01); *B01D 2239/0618* (2013.01); *B01D 2239/0631* (2013.01); *B01D 2239/0654* (2013.01); *B01D 2239/10* (2013.01); *B01D 2239/1258* (2013.01)
(58) Field of Classification Search
  USPC .... 55/381, 486, 497, 521, 524, 527, DIG. 5; 210/493.1, 493.2, 493.5, 503, 293.5
  See application file for complete search history.

(56) References Cited

U.S. PATENT DOCUMENTS

| | | | |
|---|---|---|---|
| 9,084,957 B2* | 7/2015 | Rocklitz | B01D 29/031 |
| 9,242,201 B2* | 1/2016 | Bao | B32B 5/26 |
| 10,617,990 B2* | 4/2020 | Hyoudou | B32B 3/30 |
| 10,953,360 B2* | 3/2021 | Ouyang | B01D 46/527 |
| 2011/0186504 A1* | 8/2011 | Rocklitz | B01D 46/525 |
| | | | 210/493.1 |
| 2016/0175754 A1 | 6/2016 | Morison et al. | |
| 2016/0236132 A1 | 8/2016 | Hara et al. | |
| 2020/0370217 A1 | 11/2020 | Hayashi et al. | |
| 2021/0002801 A1 | 1/2021 | Tseng et al. | |
| 2022/0136149 A1 | 5/2022 | Nakayama et al. | |

FOREIGN PATENT DOCUMENTS

| | | |
|---|---|---|
| JP | 2013-166268 A | 8/2013 |
| JP | 2015-107482 A | 6/2015 |
| JP | 2017-538574 A | 12/2017 |
| TW | 202102734 A | 1/2021 |
| WO | WO 2019/159654 A1 | 8/2019 |
| WO | WO 2021/010178 A1 | 1/2021 |

OTHER PUBLICATIONS

International Preliminary Report on Patentability and Written Opinion of the International Searching Authority for International Application No. PCT/JP2023/009731, dated Sep. 10, 2024.

Extended European Search Report for European Application No. 23770756.7, dated May 13, 2025.

* cited by examiner

AIR FILTER MEDIUM, AIR FILTER PACK, AND AIR FILTER UNIT

CROSS REFERENCE TO RELATED APPLICATIONS

This application is a Continuation of PCT International Application No. PCT/JP2023/009731, filed on Mar. 13, 2023, which claims priority under 35 U.S.C. § 119(a) to Patent Application No. JP 2022-040331, filed in Japan on Mar. 15, 2022, all of which are hereby expressly incorporated by reference into the present application.

TECHNICAL FIELD

The present disclosure relates to an air filter medium, an air filter pack, and an air filter unit.

BACKGROUND ART

In the related art, air filter media for capturing dust in gas have been required to have high performance such as high collection efficiency and low pressure loss during the passage of gas.

For example, according to an air filter medium described in Patent Literature 1 (International Publication No. 2019/159654), it is proposed to utilize an electrostatic action by using an electret nonwoven fabric, or to use a resin containing two components having a difference in crystallization start temperature as a resin constituting fibers of a nonwoven fabric.

SUMMARY

An air filter medium according to a first aspect is an air filter medium including a resin, and includes a plurality of convex portions. The convex portions protrude in an air flow direction. A projected area of the plurality of convex portions in a case where an entirety of the filter medium is projected in the air flow direction is 50% or more and 100% or less of a projected area of the entirety of the filter medium in the case where the entirety of the filter medium is projected in the air flow direction. The proportion of an effective filter medium area of the filter medium to the projected area of the entirety of the filter medium in the case where the entirety of the filter medium is projected in the air flow direction is 110% or more.

DESCRIPTION OF EMBODIMENTS

Hereafter, an air filter medium (hereafter, also simply referred to as a filter medium), an air filter pack, and an air filter unit will be described based on examples.

(1) Air Filter Medium

The air filter medium includes a main collection layer including a resin.

The main collection layer may be constituted by a porous membrane obtained by drawing a sheet-like material of a resin, or may be constituted by a nanofiber layer obtained by generating nanofibers from a resin by an electrospinning method.

The air filter medium preferably further includes a supporting layer stacked on the main collection layer in order to increase the strength. Even if it is difficult to independently use the main collection layer because of its small thickness, the supporting layer allows the independent use of the air filter medium. In addition, since the air filter medium has sufficient strength, a shape provided with convex portions, a folded shape, or the like is easily held.

Figure 1:
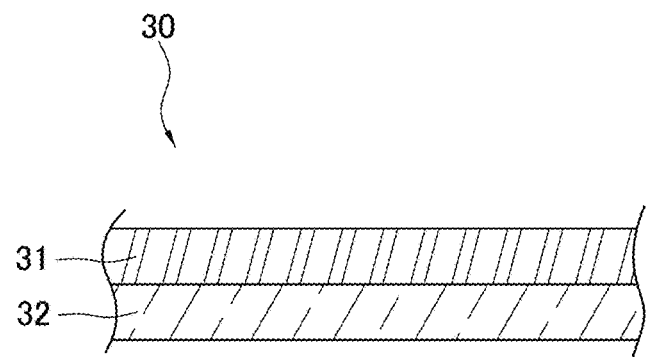
FIG. 1 is a schematic sectional view illustrating a layer structure of an air filter medium (part one).
Figure 2:
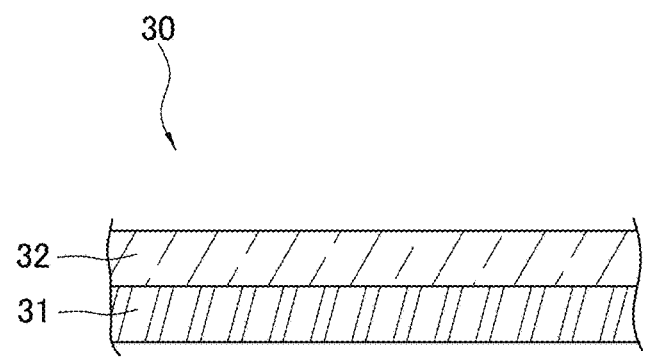
FIG. 2 is a schematic sectional view illustrating a layer structure of an air filter medium (part two).
Figure 3:
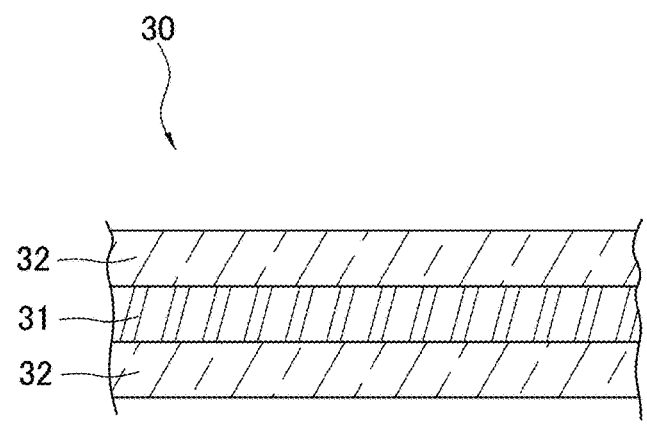
FIG. 3 is a schematic sectional view illustrating a layer structure of an air filter medium (part three).

The supporting layer may be provided only on the downstream side of an air flow with respect to the main collection layer, may be provided only on the upstream side, or may be provided on both the downstream side and the upstream side. For example, such an air filter medium may include a main collection layer 31 and an air-permeable supporting layer 32 stacked on the downstream side of the main collection layer 31 in an air flow direction, as in an air filter medium 30 illustrated in FIG. 1. Alternatively, for example, the air filter medium may include a main collection layer 31 and an air-permeable supporting layer 32 stacked on the upstream side of the main collection layer 31 in the air flow direction, as in an air filter medium 30 illustrated in FIG. 2. Alternatively, for example, the air filter medium may include a main collection layer 31 and air-permeable supporting layers 32 stacked on both the upstream side and the downstream side of the main collection layer 31 in the air flow direction, as in an air filter medium 30 illustrated in FIG. 3.

The way of stacking these layers is not limited. These layers may be bonded by using an anchor effect due to partial melting through heating or due to melting of a hot-melt resin, may be bonded by using a reactive adhesive or the like, or may be simply placed on top of each other.

(2) Main Collection Layer

Non-limiting examples of the resin constituting the main collection layer may include one or more selected from the group consisting of polytetrafluoroethylene (PTFE), nylon such as nylon 6, polypropylene, polyethylene, polystyrene, polyester, polyphenylene sulfide, polyethylene oxide, polymethyl methacrylate, cellulose acetate, polycarbonate, polyvinyl chloride, polyetherimide, polyvinyl alcohol, polyethylene terephthalate, polyacrylonitrile, polyvinylidene fluoride, polyurethane, and polycaprolactone.

When the main collection layer is constituted by a nanofiber layer obtained by generating nanofibers by an electrospinning method using a resin, the resin is preferably one or more selected from the group consisting of polypropylene, polyvinylidene fluoride, polyethylene, polyester, polyamide, aromatic polyamide, polyacrylonitrile, polyvinyl chloride, polyurethane, polylactic acid, polyphenylene sulfide, and polyimide. The nanofibers may have, for example, an average fiber diameter of 10 nm or more and 1000 nm or less.

In particular, the main collection layer is preferably constituted so as to mainly contain a fluororesin, and more preferably constituted so as to include a fluororesin porous membrane. Herein, the term "mainly" means that when a plurality of components are contained, the fluororesin has the highest weight ratio. The fluororesin porous membrane will be described later.

For the resin constituting the main collection layer, when the sample is stretched by 50% in a predetermined tensile direction parallel to the direction in which the reference plane extends at 80° C. by applying a load to the sample at a tensile speed of 100 mm/min in the predetermined tensile direction, the PF after the stretching is preferably 80% or more and 150% or less when the PF before the stretching is assumed to be 100% (the PF herein is a PF under the conditions of an air flow velocity of 9.63 cm/s and dust having a particle size of 0.075 μm).

The thickness of the main collection layer is, for example, preferably 10 μm or more from the viewpoint that the dust-holding capacity of dust can be improved. The thickness of the main collection layer is also preferably 50 μm or less from the viewpoint of suppressing an excessive increase in the thickness of a folded portion when the main collection layer is used while having the folded portion. The thicknesses of the main collection layer is a thickness measured when a load of 0.3 N is imposed on a measurement target in a particular measuring instrument. The main collection layer used for the air filter medium of the present embodiment includes convex portions. For example, the thickness can be grasped as a value obtained by measuring, at a load of 0.3 N, the thickness of a plurality of main collection layers stacked, measuring, at a load of 0.3 N, the thickness of main collection layers on which a plurality of additional main collection layers are stacked, and dividing the difference between the measured thicknesses by the number of the additional main collection layers.

(2-1) Fluororesin Porous Membrane

The fluororesin porous membrane more preferably has a porous membrane structure having fibrils (fibers, not illustrated) and nodes (nodal portions, not illustrated) connected to the fibrils.

An example of the components other than the fluororesin in the fluororesin porous membrane is an inorganic filler that is a non-fibril-forming non-melting-processable component (B component) described later.

The fluororesin used for the fluororesin porous membrane may be formed of one component or two or more components. The fluororesin is also, for example, a fluororesin containing a fibril-forming PTFE (hereafter also referred to as an A component). The fluororesin is also, for example, a three-component mixture of the A component, a non-fibril-forming non-melting-processable component (hereafter also referred to as a B component), and a non-fibril-forming hot-melt-processable component (hereafter also referred to as a C component) having a melting point of lower than 320° C.

(2-2) A Component: Fibril-Forming PTFE

The fibril-forming PTFE has, for example, drawability and non-melt fabricability. The term "non-melt fabricability" means that the polymer has a high melt viscosity and therefore does not readily flow in a molten state, which makes it difficult to perform melt fabrication. The fibril-forming PTFE preferably has a melt viscosity at 380° C. of $1\times10^8$ Pa·s or more.

The fibril-forming PTFE is, for example, a high-molecular-weight PTFE obtained through emulsion polymerization or suspension polymerization of tetrafluoroethylene (TFE). The high molecular weight herein is a molecular weight at which fibrillation is easily caused and fibrils having a large fiber length are obtained during drawing in the production of a porous membrane, the standard specific gravity (SSG) is 2.130 to 2.230, and the melt flow substantially does not occur because of the high melt viscosity. The SSG of the fibril-forming PTFE is preferably 2.130 to 2.190 and more preferably 2.140 to 2.170 from the viewpoint of achieving ease of fibrillation and providing fibrils having a large fiber length. An excessively high SSG may deteriorate the drawability. An excessively low SSG deteriorates the rollability and thus deteriorates the uniformity of the porous membrane, which may increase the pressure loss of the porous membrane. The standard specific gravity (SSG) is measured in conformity to ASTM D 4895.

From the viewpoint of achieving ease of fibrillation and providing fibrils having a large fiber length, a PTFE obtained through emulsion polymerization is preferred. Emulsion polymerization can be generally performed in an aqueous medium containing TFE or TFE and a monomer other than TFE, a dispersant, and a polymerization initiator. The emulsion polymerization is preferably performed with gentle stirring under stirring conditions set so that the produced PTFE fine particles do not aggregate. In the emulsion polymerization, the polymerization temperature is generally 20 to 100° C. and preferably 50 to 85° C. The polymerization pressure is generally 0.5 to 3.0 MPa. The polymerization initiator in the emulsion polymerization is preferably, for example, a radical polymerization initiator or a redox polymerization initiator.

PTFE may constitute a fine powder obtained by emulsion polymerization. The fine powder can be obtained by collecting PTFE fine particles from the PTFE aqueous dispersion obtained by the above-described emulsion polymerization, coagulating the PTFE fine particles, and then drying the coagulated fine particles. The fine powder formed of the PTFE has good extrudability, and can be paste-extruded at an extrusion pressure of, for example, 20 MPa or less. The extrusion pressure is a pressure measured when paste extrusion is performed through an orifice (diameter 2.5 cm, land length 1.1 cm, and entrance angle) 30° at a reduction ratio of 100, an extrusion speed of 51 cm/min, and a temperature of 25° C. In the paste extrusion, in general, the fine powder is mixed with an extrusion aid (lubricant), then premolded, and extruded. The extrusion aid is not limited, and a publicly known extrusion aid can be used. The extrusion aid is preferably a petroleum hydrocarbon having a boiling point of 150° C. or higher, such as naphtha. The amount of the extrusion aid used varies depending on, for example, the kind of the extrusion aid, but is usually 5 parts by weight or more and 50 parts by weight or less (P) based on 100 parts by weight of the PTFE powder. The amount is preferably 10 parts by weight or more and 40 parts by weight or less and more preferably 25 parts by weight or more and 35 parts by weight or less. The premolding and extrusion can be performed by publicly known methods, and the conditions can be appropriately selected.

The presence or absence of fibrillability, that is, whether fibrillation is achieved or not can be judged by checking whether paste extrusion, which is a typical method for molding a high-molecular-weight PTFE powder obtained from a polymer of TFE, can be performed or not. Normally, paste extrusion can be performed because a high-molecular-weight PTFE has fibrillability. In the case where an unbakedmolded body obtained through paste extrusion substantially does not have strength or elongation, such as the case where the molded body has an elongation of 0% and is broken when stretched, such a molded body can be considered to have no fibrillability.

The high-molecular-weight PTFE may be a modified polytetrafluoroethylene (hereafter referred to as a modified PTFE), a homo-polytetrafluoroethylene (hereafter referred to as a homo-PTFE), or a mixture of a modified PTFE and a homo-PTFE. The content of the modified PTFE in the high-molecular-weight PTFE is preferably 10 wt % or more and 98 wt % or less and more preferably 50 wt % or more and 95 wt % or less from the viewpoint of favorably maintaining the moldability of polytetrafluoroethylene. Non-limiting examples of the homo-PTFE that can be suitably used include homo-PTFEs disclosed in Japanese Unexamined Patent Application Publication No. 53-60979, Japanese Unexamined Patent Application Publication No. 57-135, Japanese Unexamined Patent Application Publication No. 61-16907, Japanese Unexamined Patent Application Publication No. 62-104816, Japanese Unexamined Patent Application Publication No. 62-190206, Japanese Unexamined Patent Application Publication No. 63-137906, Japanese Unexamined Patent Application Publication No. 2000-143727, Japanese Unexamined Patent Application Publication No. 2002-201217, International Publication No. 2007/046345, International Publication No. 2007/119829, International Publication No. 2009/001894, International Publication No. 2010/113950, and International Publication No. 2013/027850. In particular, homo-PTFEs disclosed in Japanese Unexamined Patent Application Publication No. 57-135, Japanese Unexamined Patent Application Publication No. 63-137906, Japanese Unexamined Patent Application Publication No. 2000-143727, Japanese Unexamined Patent Application Publication No. 2002-201217, International Publication No. 2007/046345, International Publication No. 2007/119829, and International Publication No. 2010/113950 are preferred from the viewpoint of high drawability.

The modified PTFE is constituted by TFE and a monomer other than TFE (hereafter referred to as a modifying monomer). Non-limiting examples of the modified PTFE include PTFEs homogeneously modified by the modifying monomer, PTFEs modified at the beginning of polymerization reaction, and PTFEs modified at the end of polymerization reaction. The modified PTFE is preferably a TFE copolymer obtained by subjecting a trace amount of a monomer other than TFE to polymerization together with TFE without considerably impairing the properties of the TFE homopolymer. Examples of the modified PTFE that can be suitably used include modified PTFEs disclosed in Japanese Unexamined Patent Application Publication No. 60-42446, Japanese Unexamined Patent Application Publication No. 61-16907, Japanese Unexamined Patent Application Publication No. 62-104816, Japanese Unexamined Patent Application Publication No. 62-190206, Japanese Unexamined Patent Application Publication No. 64-1711, Japanese Unexamined Patent Application Publication No. 2-261810, Japanese Unexamined Patent Application Publication No. 11-240917, Japanese Unexamined Patent Application Publication No. 11-240918, International Publication No. 2003/033555, International Publication No. 2005/061567, International Publication No. 2007/005361, International Publication No. 2011/055824, and International Publication No. 2013/027850. In particular, modified PTFEs disclosed in Japanese Unexamined Patent Application Publication No. 61-16907, Japanese Unexamined Patent Application Publication No. 62-104816, Japanese Unexamined Patent Application Publication No. 64-1711, Japanese Unexamined Patent Application Publication No. 11-240917, International Publication No. 2003/033555, International Publication No. 2005/061567, International Publication No. 2007/005361, and International Publication No. 2011/055824 are preferred from the viewpoint of high drawability.

The modified PTFE contains a TFE unit based on TFE and a modifying monomer unit based on the modifying monomer. The modifying monomer unit is a moiety in a molecular structure of the modified PTFE, the moiety being derived from the modifying monomer. The content of the modifying monomer unit in all monomer units of the modified PTFE is preferably 0.001 to 0.500 wt % and more preferably 0.01 to 0.30 wt %. The all monomer units are moieties derived from all monomers in a molecular structure of the modified PTFE.

The modifying monomer is not limited as long as the modifying monomer is copolymerizable with TFE. Examples of the modifying monomer include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; and (perfluoroalkyl) ethylenes (PFAE) and ethylene. A single modifying monomer may be used or a plurality of modifying monomers may be used.

The perfluorovinyl ethers are not limited. For example, an unsaturated perfluoro compound represented by general formula (1) below can be used.

$$CF_2 = CF - ORf \qquad (1)$$

In the formula, Rf represents a perfluoro organic group.

In this specification, the perfluoro organic group is an organic group obtained by substituting all hydrogen atoms bonding to carbon atoms with fluorine atoms. The perfluoro organic group may contain ether oxygen.

An example of the perfluorovinyl ether is a perfluoro (alkyl vinyl ether) (PAVE) with Rf representing a perfluoroalkyl group having 1 to 10 carbon atoms in the general formula (1). The perfluoroalkyl group preferably has 1 to 5 carbon atoms. Examples of the perfluoroalkyl group in PAVE include a perfluoromethyl group, a perfluoroethyl group, a perfluoropropyl group, a perfluorobutyl group, a perfluoropentyl group, and a perfluorohexyl group. The PAVE is preferably perfluoro(propyl vinyl ether) (PPVE) or perfluoro(methyl vinyl ether) (PMVE).

The perfluoroalkyl ethylene (PFAE) is not limited, and examples thereof include perfluorobutyl ethylene (PFBE) and perfluorohexyl ethylene (PFHE).

The modifying monomer in the modified PTFE is preferably at least one monomer selected from the group consisting of HFP, CTFE, VDF, PAVE, PFAE, and ethylene.

When the fluororesin porous membrane is formed by using a B component and a C component described later, the content of the homo-PTFE in the fibril-forming PTFE is particularly preferably more than 50 wt % from the viewpoint of achieving ease of fibrillation and providing fibrils having a large fiber length.

When not only the fibril-forming PTFE (A component) but also a non-fibril-forming non-melting-processable component (B component) and a non-fibril-forming hot-melt-processable component having a melting point of lower than 320° C. (C component) are contained in the fluororesin porous membrane, the following components can be used as the B component and the C component. The fluororesin porous membrane formed of these three components has a membrane structure with a higher porosity and a larger thickness than known fibril-forming PTFE (high-molecular-weight PTFE) porous membranes. Therefore, fine particles in gas can be collected in a large region of the filter medium in an air flow direction, which can improve the dust-holding capacity. By forming the fluororesin porous membrane from these three components, the dust-holding capacity of liquid particles can be particularly increased rather than that of solid particles.

(2-3) B Component: Non-Fibril-Forming Non-Melting-Processable Component

The non-fibril-forming non-melting-processable component is mainly unevenly distributed in the nodal portions as non-fibrous particles and has a function of suppressing fibrillation of the fibril-forming PTFE.

Examples of the non-fibril-forming non-melting-processable component include components having thermoplasticity, such as low-molecular-weight PTFEs; thermosetting resins; inorganic fillers; and mixtures of the foregoing.

The component having thermoplasticity preferably has a melting point of 320° C. or higher and has as high a melt viscosity as possible. For example, the low-molecular-weight PTFE has a high melt viscosity and therefore can remain in the nodal portions even when processed at a temperature higher than or equal to the melting point. In this specification, the low-molecular-weight PTFE is a PTFE having a number-average molecular weight of 600,000 or less, a melting point of 320° C. or higher and 335° C. or lower, and a melt viscosity at 380° C. of 100 Pa·s to $7.0 \times 10^5$ Pa·s (refer to Japanese Unexamined Patent Application Publication No. 10-147617).

Examples of the method for producing a low-molecular-weight PTFE include a method in which a high-molecular-weight PTFE powder (molding powder) obtained through suspension polymerization of TFE or a high-molecular-weight PTFE powder (FP: fine powder) obtained through emulsion polymerization of TFE and a particular fluoride are thermally decomposed by causing a catalytic reaction at high temperature (refer to Japanese Unexamined Patent Application Publication No. 61-162503), a method in which the high-molecular-weight PTFE powder or a molded body is irradiated with ionizing radiation (refer to Japanese Unexamined Patent Application Publication No. 48-78252), and a method in which TFE is directly polymerized together with a chain transfer agent (refer to, e.g., International Publication No. 2004/050727, International Publication No. 2009/020187, and International Publication No. 2010/114033). The low-molecular-weight PTFE may be a homo-PTFE or the above-described modified PTFE containing a modifying monomer as in the case of the fibril-forming PTFE.

The low-molecular-weight PTFE has no fibrillability. The presence or absence of fibrillability can be judged by the above-described method. For the low-molecular-weight PTFE, an unbakedmolded body obtained through paste extrusion substantially does not have strength or elongation, such as an elongation of 0%, and is broken when stretched.

The low-molecular-weight PTFE is not limited, but preferably has a melt viscosity at 380° C. of 1000 Pa·s or more, more preferably 5000 Pa·s or more, and further preferably 10000 Pa·s or more. At a high melt viscosity, even if the non-fibril-forming hot-melt-processable component serving as a C component is melted during production of the porous membrane, the non-fibril-forming non-melting-processable component can remain in the nodal portions, which can suppress the fibrillation.

Examples of the thermosetting resin include epoxy resin, silicone resin, polyester resin, polyurethane resin, polyimide resin, phenolic resin, and mixtures of the foregoing resins. The thermosetting resin is desirably an uncured resin dispersed in water from the viewpoint of workability of co-coagulation. Each of these thermosetting resins is commercially available.

Examples of the inorganic filler include talc, mica, calcium silicate, glass fiber, calcium carbonate, magnesium carbonate, carbon fiber, barium sulfate, calcium sulfate, and mixtures of the foregoing. In particular, talc is preferably used from the viewpoint of specific gravity and affinity for a fibril-forming high-molecular-weight PTFE. The inorganic filler preferably has a particle size of 3 μm or more and 20 μm or less from the viewpoint of formation of a stable dispersion body during production of the porous membrane. The particle size is an average particle size measured by a laser diffraction/scattering method. Each of these inorganic fillers is commercially available.

The non-fibril-forming non-melting-processable component may contain the above-described components in a combined manner.

The content of the non-fibril-forming non-melting-processable component in the porous membrane may be 1 wt % or more and 50 wt % or less, and is preferably 20 wt % or more and 40 wt % or less and more preferably 30 wt %.

(2-4) C Component: Non-Fibril-Forming Hot-Melt-Processable Component having Melting Point of Lower than 320° C.

The non-fibril-forming hot-melt-processable component having a melting point of lower than 320° C. (hereafter also referred to as a non-fibril-forming hot-melt-processable component) has flowability when melted. Therefore, the non-fibril-forming hot-melt-processable component can be melted during production (drawing) of the porous membrane and cured in the nodal portions. This increases the strength of the whole porous membrane and thus can suppress the deterioration of filter performance even if the porous membrane is compressed, for example, in the downstream processes.

The non-fibril-forming hot-melt-processable component preferably has a melt viscosity of less than 10000 Pa·s at 380° C. The melting point of the non-fibril-forming hot-melt-processable component is a temperature at a peak top of a heat-of-fusion curve obtained when the component is heated to a temperature higher than or equal to the melting point at a temperature-increasing rate of 10° C./min to be completely melted once, cooled to a temperature lower than or equal to the melting point at 10° C./min, and then heated again at 10° C./min using a differential scanning calorimeter (DSC).

Examples of the non-fibril-forming hot-melt-processable component include components that sufficiently exhibit meltability and flowability at a drawing temperature during production of the porous membrane, such as heat-meltable fluoropolymer, polystyrene resin, polyethylene terephthalate (PET) resin, polyester resin, polyamide resin, and mixtures of the foregoing resins. In particular, a heat-meltable fluoropolymer is preferred from the viewpoint of high heat resistance at a drawing temperature during production of the porous membrane and high chemical resistance. The heat-meltable fluoropolymer is a fluoropolymer having a copolymer unit derived from at least one fluorinated ethylenically unsaturated monomer, preferably two or more fluorinated ethylenically unsaturated monomers, represented by general formula (2) below.

$$RCF=CR_2 \qquad (2)$$

(In the formula, R are each independently selected from H, F, Cl, alkyl having 1 to 8 carbon atoms, aryl having 6 to 8 carbon atoms, cyclic alkyl having 3 to 10 carbon atoms, and perfluoroalkyl having 1 to 8 carbon atoms. In this case, all R may be the same, any two R may be the same and the remaining one R may be different from the two R, or all R may be different from each other.)

Non-limiting useful examples of the compound represented by the general formula (2) include perfluoroolefins such as fluoroethylene, VDF, trifluoroethylene, TFE, and HFP; chlorofluoroolefins such as CTFE and dichlorodifluoroethylene; (perfluoroalkyl)ethylenes such as PFBE and PFHE; perfluoro-1,3-dioxole; and mixtures of the foregoing.

The fluoropolymer may also include a copolymer derived from copolymerization of at least one monomer represented by the above general formula (2) and at least one copolymerizable comonomer represented by the above general formula (1) and/or general formula (3) below.

$$R_2C=CR_2 \qquad (3)$$

(In the formula, R are each independently selected from H, Cl, an alkyl group having 1 to 8 carbon atoms, an aryl group having 6 to 8 carbon atoms, and a cyclic alkyl group having 3 to 10 carbon atoms. In this case, all R may be the same, any two or more R may be the same and the remaining R may be different from the two or more R, or all R may be different from each other. If the remaining R are plural R, the plural R may be different from each other.)

A useful example of the compound represented by the general formula (1) is a perfluoro (alkyl vinyl ether) (PAVE). The PAVE is preferably perfluoro (propyl vinyl ether) (PPVE) or perfluoro(methyl vinyl ether) (PMVE).

Useful examples of the compound represented by the general formula (3) include ethylene and propylene.

More specific examples of the fluoropolymer include polyfluoroethylene derived from polymerization of fluoroethylene, polyvinylidene fluoride (PVDF) derived from polymerization of vinylidene fluoride (VDF), polychlorotrifluoroethylene (PCTFE) derived from polymerization of chlorotrifluoroethylene (CTFE), a fluoropolymer derived from copolymerization of two or more different monomers represented by the general formula (2), and a fluoropolymer derived from copolymerization of at least one monomer represented by the general formula (2) and at least one monomer represented by the general formula (1) and/or at least one monomer represented by the general formula (3).

Examples of the fluoropolymer include polymers having a copolymer unit derived from VDF and hexafluoropropylene (HFP) and polymers derived from TFE and at least one copolymerizable comonomer (at least 3 wt %) other than TFE. Examples of the latter fluoropolymer include TFE/PAVE copolymers (PFA), TFE/PAVE/CTFE copolymers, TFE/HFP copolymers (FEP), TFE/ethylene copolymers (ETFE), TFE/HFP/ethylene copolymers (EFEP), TFE/VDF copolymers, TFE/VDF/HFP copolymers, TFE/VDF/CTFE copolymers, and mixtures of the foregoing copolymers.

The non-fibril-forming hot-melt-processable component may contain the above-described components in a combined manner.

The content of the non-fibril-forming hot-melt-processable component in the porous membrane is preferably 0.1 wt % or more and less than 20 wt %.

The content of the non-fibril-forming hot-melt-processable component is preferably 10 wt % or less to satisfactorily perform drawing at an area drawing ratio of 40 times or more and 800 times or less.

(2-5) Method for Producing Fluororesin Porous Membrane

Next, a method for producing an air filter medium will be described by taking examples.

In the production of the fluororesin porous membrane, a fluororesin can be used. For example, the fluororesin is preferably formed of the above-described A component or the above-described three components.

The form of the three components A to C described above is not limited, and is, for example, a composition, a mixed powder, or a molding material described later. The composition, the mixed powder, and the molding material each contain the above-described A component, B component, and C component and each contain the C component, for example, in an amount of 0.1 wt % or more and less than 20 wt % relative to the total amount.

The form of the raw material for the porous membrane may be a mixed powder described later or a non-powdery mixture or may be a molding material or a composition described later. The mixed powder is, for example, a fine powder obtained through co-coagulation, a powder obtained by mixing two raw materials out of three through co-coagulation and mixing the remaining component using a mixer, or a powder obtained by mixing three raw materials using a mixer, which are used in Examples below. The non-powdery mixture is, for example, a molded body such as a porous body (e.g., a porous membrane) or an aqueous dispersion body containing the three components.

The molding material is a material adjusted for processing required to mold a composition, such as a material to which a processing aid (e.g., liquid lubricant) or the like is added, a material whose grain size is adjusted, or a preliminarily molded material. The molding material may contain, for example, a publicly known additive in addition to the above three components. Examples of the publicly known additive include carbon materials such as carbon nanotube and carbon black, pigments, photocatalysts, activated carbon, antibacterial agents, adsorbents, and deodorizers.

The composition can be produced by various methods. For example, when the composition is a mixed powder, the composition can be produced by a method in which a powder of the A component, a powder of the B component, and a powder of the C component are mixed with each other using a typical mixer or the like, a method in which an aqueous dispersion containing the A component, an aqueous dispersion containing the B component, and an aqueous dispersion containing the C component are co-coagulated to obtain a co-coagulated powder, or a method in which a mixed powder obtained by, in advance, co-coagulating an aqueous dispersion containing any two components of the A component, the B component, and the C component is mixed with a powder of the remaining one component using a typical mixer or the like.

The co-coagulation method is, for example, as follows:
(i) a method in which an aqueous dispersion of the A component, an aqueous dispersion of the B component, and an aqueous dispersion of the C component are mixed with each other and then coagulation is performed;
(ii) a method in which an aqueous dispersion containing any one of the A component, the B component, and the C component is mixed with powders of the remaining two components and then coagulation is performed;

(iii) a method in which a powder of any one of the A component, the B component, and the C component is added to a mixed aqueous dispersion containing aqueous dispersions of the remaining two components in a mixed manner and then coagulation is performed; and (iv) a method in which a two-component mixed powder obtained by mixing in advance aqueous dispersions of any two of the A component, the B component, and the C component and then performing coagulation is added to an aqueous dispersion of the remaining one component and then coagulation is performed.

The method (i) is preferred as a co-coagulation method because the three components are easily dispersed in a uniform manner.

After the co-coagulation, dehydration and drying are performed and extrusion is performed using a liquid lubricant (extrusion aid) added. Any liquid lubricant may be used as long as the liquid lubricant can wet the surface of the PTFE powder and is a substance that can be removed after the mixture obtained through co-coagulation is molded into a film. Examples of the liquid lubricant include hydrocarbon oils such as liquid paraffin, naphtha, white oil, toluene, and xylene, alcohols, ketones, and esters.

The mixture obtained through co-coagulation is mixed with a liquid lubricant and then extruded and rolled by a publicly known method to obtain a molded film-like product. Herein, the amount of the liquid lubricant mixed with the fluororesin (for example, a mixture obtained by co-coagulation) can be set to 10 parts by weight or more and 40 parts by weight or less with respect to 100 parts by weight of the fluororesin, and is preferably 25 parts by weight or more and 35 parts by weight or less.

The extrusion is performed by, for example, paste extrusion or ram extrusion and preferably by paste extrusion. A sheet-shaped extruded product obtained through paste extrusion is rolled using a calender roll or the like under heating at a temperature of, for example, 40° C. or higher and 80° C. or lower. The thickness of the obtained film-like rolled product is set in accordance with the thickness of the intended porous membrane and is normally 100 μm or more and 1000 μm or less, may be 100 μm or more and 400 μm or less, and is preferably 150 μm or more and 350 μm or less.

Subsequently, the liquid lubricant is removed from the unbaked film that is the rolled product. The liquid lubricant is removed by a heating method and/or an extracting method.

Herein, the rolled product from which the liquid lubricant has been removed is preferably subjected to heat treatment in an atmosphere at a temperature of 250° C. or higher and 325° C. or lower for 1 minute or longer before drawing from the viewpoint of sufficiently ensuring the thickness of the obtained fluororesin porous membrane and decreasing the pressure loss.

Thus, the rolled product from which the liquid lubricant has been removed or the rolled product further subjected to heat treatment is drawn. When the non-fibril-forming hot-melt-processable component and the non-fibril-forming non-melting-processable component are contained, the drawing is performed at a temperature that is higher than or equal to the melting point of the non-fibril-forming hot-melt-processable component and that is lower than or equal to the decomposition temperature of the non-fibril-forming non-melting-processable component.

When a non-fibril-forming hot-melt-processable component is used in the production of the fluororesin porous membrane, the non-fibril-forming hot-melt-processable component melts in the drawing process and subsequently solidifies at the nodal portions, to thereby enable increase of the strength of the porous membrane in the air flow direction. The drawing temperature at this time may be set in accordance with the temperature of a furnace in which the drawing is performed, or the temperature of a heating roller that conveys the rolled product, or a combination of these temperatures.

The drawing is performed in a first direction and preferably in a second direction orthogonal to the first direction. Herein, the drawing in the second direction may be performed after the drawing in the first direction. The drawing in the first direction and the drawing in the second direction may be simultaneously performed. In the present embodiment, the first direction is a longitudinal direction (machine direction: MD) of the rolled product, and the second direction is a width direction (transverse direction: TD) of the rolled product. The drawing may be performed simultaneously while a plurality of rolled products are stacked.

The area drawing ratio of the rolled product may be 250 times or more and 800 times or less, is preferably 300 times or more and 600 times or less, and is more preferably 400 times or more and 580 times or less.

The obtained porous membrane is preferably subjected to heat setting to achieve mechanical strength and dimensional stability. The temperature during the heat setting may be a temperature higher than or equal to the melting point of PTFE or lower than the melting point of PTFE and is preferably 250° C. or higher and 400° C. or lower.

The fluororesin porous membrane may have a single-layer structure or may have a multilayer structure in which a first fluororesin porous membrane and a second fluororesin porous membrane are stacked.

(3) Supporting Layer

Non-limiting examples of the material and structure of the supporting layer include nonwoven fabric, woven fabric, metal mesh, and resin net. In particular, a nonwoven fabric having heat fusibility is preferred from the viewpoint of strength, collectability, flexibility, and workability. The nonwoven fabric is preferably a nonwoven fabric in which some or all of constituent fibers have a core/sheath structure, a two-layer nonwoven fabric including a fiber layer formed of a low-melting-point material and a fiber layer formed of a high-melting-point material, or a nonwoven fabric whose surface is coated with a heat fusible resin. Such a nonwoven fabric is, for example, a spun-bonded nonwoven fabric. The nonwoven fabric having a core/sheath structure is preferably a nonwoven fabric in which the core component has a higher melting point than the sheath component. Examples of the combination of materials for the core/sheath include PET/PE and high-melting-point polyester/low-melting-point polyester. Examples of the combination of the low-melting-point material/high-melting-point material of the two-layer nonwoven fabric include PE (polyethylene)/PET (polyethylene terephthalate), PP (polypropylene)/PET, PBT (polybutylene terephthalate)/PET, and low-melting-point PET/high-melting-point PET. Examples of the nonwoven fabric whose surface is coated with a heat fusible resin include a PET nonwoven fabric whose surface is coated with EVA (ethylene-vinyl acetate copolymer resin) and a PET nonwoven fabric whose surface is coated with an olefin resin.

Non-limiting examples of the material for the nonwoven fabric include polyolefins (e.g., PE and PP), polyamides, polyesters (e.g., PET), aromatic polyamides, and composite materials of the foregoing.

The supporting layer has a pressure loss and a collection efficiency much lower than those of the above-described main collection layer. The pressure loss and the collection efficiency may be values considered to be substantially zero. The pressure loss obtained when air is passed through the supporting layer at a flow velocity of 9.63 cm/s is, for example, preferably 10 Pa or less, more preferably 5 Pa or less, and further preferably 1 Pa or less. The pressure loss obtained when air is passed through the supporting layer at a flow velocity of 5.3 cm/s is, for example, preferably 5 Pa or less and more preferably 1 Pa or less. The collection efficiency of the supporting layer grasped by using NaCl particles having a particle size of 0.075 μm may be, for example, a value considered to be substantially zero or about zero. The collection efficiency of the supporting layer grasped by using NaCl particles having a particle size of 0.3 μm may be, for example, a value considered to be substantially zero or about zero.

The thickness of the supporting layer is, for example, preferably 500 μm or less and more preferably 300 μm or less. The thickness of the supporting layer is preferably 50 μm or more and more preferably 75 μm or more from the viewpoint of making it easy to maintain the shape of the convex portions disposed on the air filter medium or from the viewpoint of making it easy to maintain the pleated shape when the air filter medium is used in a form folded into a pleated shape. The thickness of the supporting layer is a thickness measured when a load of 0.3 N is imposed on a measurement target in a particular measuring instrument. The supporting layer used for the air filter medium of the present embodiment includes convex portions. For example, the thickness can be grasped as a value obtained by measuring, at a load of 0.3 N, the thickness of a plurality of supporting layers stacked, measuring, at a load of 0.3 N, the thickness of supporting layers on which a plurality of additional supporting layers are stacked, and dividing the difference between the measured thicknesses by the number of the additional supporting layers.

(4) Shape of Air Filter Medium

The air filter medium includes a plurality of convex portions protruding in the air flow direction. This can increase the effective filter medium area through which the air flow passes compared with air filter media having a flat shape. By increasing the effective filter medium area, the flow velocity of the air flow passing through the filter medium can be decreased, which can improve the collection efficiency. Furthermore, since the rigidity can be easily increased compared with air filter media having a flat shape, deformation of the filter medium due to wind pressure during use can be suppressed.

From the viewpoint of easily ensuring a sufficient effective filter medium area in the air filter medium, the convex portions of the air filter medium preferably include a plurality of first convex portions protruding toward the upstream side in the air flow direction and a plurality of second convex portions protruding toward the downstream side in the air flow direction.

The plurality of first convex portions of the air filter medium are located on the upstream side of the air flow passing through the air filter medium with respect to the reference plane of the air filter medium. The protrusion heights of the plurality of first convex portions may all be the same, or may be different from each other.

The plurality of second convex portions of the air filter medium are located on the downstream side of the air flow passing through the air filter medium with respect to the reference plane of the air filter medium. The protrusion heights of the plurality of second convex portions may all be the same, or may be different from each other.

The average protrusion height of the plurality of first convex portions may be the same as or different from the average protrusion height of the plurality of second convex portions. From the viewpoint of suppressing the generation of unbalanced strain on any of the first convex portions and the second convex portions at the time of response formation, the average protrusion height of the plurality of first convex portions is preferably 50% or more and 150% or less, more preferably 70% or more and 130% or less, further preferably 90% or more and 110% or less, and most preferably the same as the average protrusion height of the plurality of second convex portions.

Herein, the reference plane of the air filter medium is determined in the order of (i) to (iii) below.
(i) When a plane extending on the same level is present between the convex portions of the air filter medium, the plane serves as a reference plane.
(ii) When there is no plane extending on the same level between the convex portions of the air filter medium, but there is a plane extending on the same level in the peripheral portion of the air filter medium, the plane serves as a reference plane.
(iii) When there is no plane extending on the same level between the convex portions of the air filter medium or in the peripheral portion of the air filter medium, an imaginary plane extending at an intermediate position in the air flow direction between a first imaginary plane extending so as to connect the protruding end portions of the plurality of first convex portions of the air filter medium and a second imaginary plane extending so as to connect the protruding end portions of the plurality of second convex portions serves as a reference plane.

Figure 4:
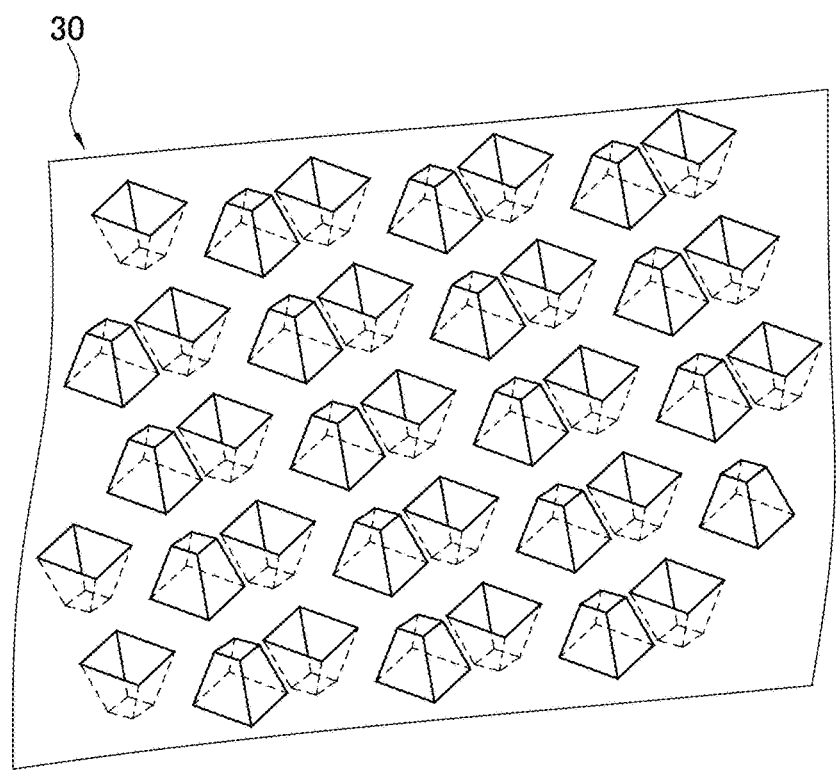
FIG. 4 is a partially enlarged external perspective view illustrating an example (part one) of an air filter medium in which convex portions are formed in a dot pattern.
Figure 5:
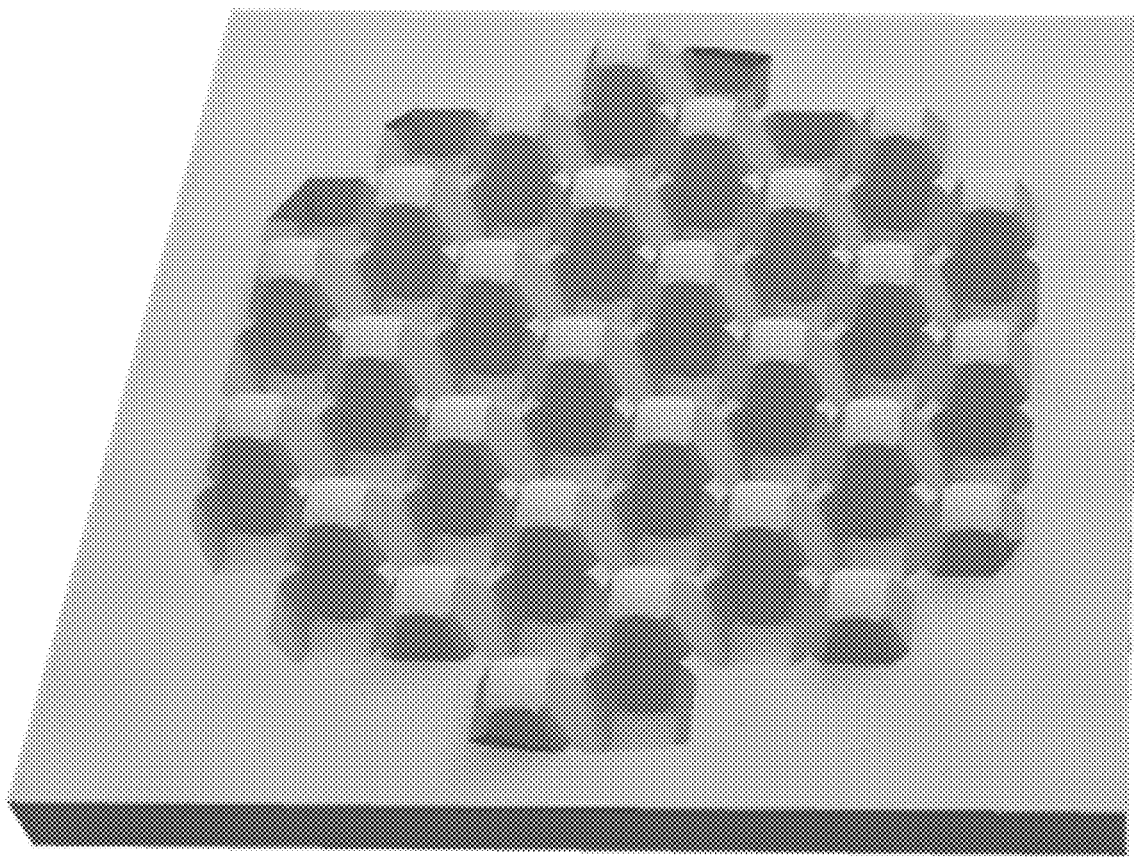
FIG. 5 is an external schematic perspective view illustrating an example of an embossing die for producing an air filter medium in which first convex portions and second convex portions are continuously provided.

The convex portions of the air filter medium may be formed, for example, in a dot pattern as illustrated in FIG. 4 when viewed in the air flow direction. When the air filter medium is viewed in the air flow direction, the ratio of the length of a convex portion in the longitudinal direction to the length of the convex portion in a direction perpendicular to the longitudinal direction may be 0.25 or more and 4.0 or less, and is preferably 0.5 or more and 2.0 or less. For the convex portions, the plurality of first convex portions and the plurality of second convex portions may be formed in a dot pattern. In this case, when the air filter medium is viewed in the air flow direction, one of the first convex portions may be surrounded by three or more of the second convex portions, or one of the first convex portions may be surrounded by four or more of the second convex portions. When the air filter medium is viewed in the air flow direction, one of the second convex portions may be surrounded by three or more of the first convex portions, or one of the second convex portions may be surrounded by four or more of the first convex portions. Alternatively, for example, an air filter medium in which the first convex portions and the second convex portions are continuously provided may be obtained by performing embossing using an embossing die illustrated in FIG. 5. In this case, it is possible to continuously provide the first convex portions and the second convex portions when viewed in the air flow direction, which can eliminate interposed portions between the first convex portions and the second convex portions when viewed in the air flow direction. As a result, when the first convex portions and the second convex portions are formed by performing embossing that causes rising in the air flow direction, it is possible to suppress the nonuniformity of a filter medium structure due to the presence of regions that deform (the first convex portions and the second convex portions) and regions that do not deform (interposed portions). Furthermore, when the first convex portions and the second convex portions are raised in the air flow direction, it is easy to suppress the generation of stress which may be locally generated in the vicinity of the boundary between the first convex portions and the interposed portions and in the vicinity of the boundary between the second convex portions and the interposed portions, which easily suppresses the formation of portions which are locally thinned by stretching.

Figure 6:
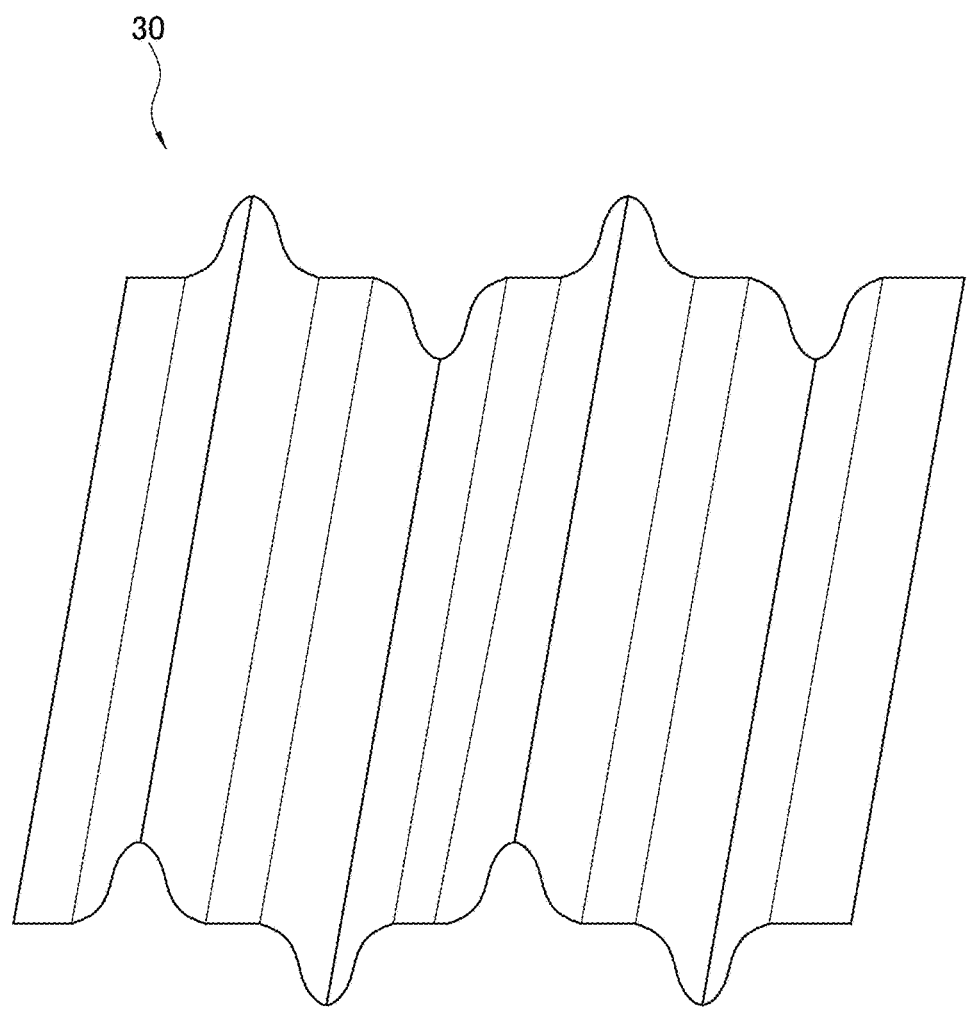
FIG. 6 is a partially enlarged external perspective view illustrating an example (part two) of an air filter medium in which convex portions are formed in a striped pattern.

Alternatively, the convex portions of the air filter medium may be formed in a stripe shape as illustrated in FIG. 6 when viewed in the air flow direction. The convex portions may be formed such that stripe-shaped first convex portions and stripe-shaped second convex portions are alternately arranged in parallel to each other.

The three dimensional shape of the dot-like convex portion is not limited, and can be selected from various shapes such as a rectangular parallelepiped, a cube, a prism, a cylinder, a hemisphere, a spherical segment, a prismoid, a cone, a pyramid, and a truncated cone. The top surface of the embossed protrusion may be a flat surface having a flat rectangular shape such as a rectangle or a square, or may be a curved surface having a curvature such as a hemisphere or a cylinder.

A method for forming the convex portions is not limited. For example, the convex portions may be formed by embossing an obtained flat sheet-shaped filter medium. In the embossing, the air filter medium is sandwiched in the air flow direction using an embossing die having a plurality of embossed projections of a specific shape and a plurality of embossed recesses of a shape corresponding to that of the embossed projections. As a result, the air filter medium is stretched in the air flow direction, thereby forming convex portions. The embossing may be performed at an atmospheric temperature of 50° C. or higher and 150° C. or lower, preferably 70° C. or higher and 130° C. or lower, and may be performed at 80° C. The shape, size, protrusion height, and formation density of the convex portions provided on the air filter medium can be adjusted by changing the shape of the embossing die. The embossing die may have a plate-like shape or a roll-like shape.

To avoid local damage, the air filter medium preferably has no folds.

The air filter medium on which the plurality of first convex portions and the plurality of second convex portions are formed more preferably has portions where the first convex portions and the second convex portions are continuously provided without a flat plane interposed between the first convex portions and the second convex portions. For example, when the first convex portions and the second convex portions are formed at the same time by performing embossing, local generation of a stretching load is suppressed between the first convex portions and the second convex portions and at any of the first convex portions and the second convex portions, and the occurrence of damage in the air filter medium is easily suppressed.

The proportion of the convex portions in the air filter medium is 50% or more and 100% or less, may be 60% or more and 95% or less, and may be 70% or more and 90% or less. Herein, the "proportion of the convex portions" is a percentage of the total of the plurality of convex portions relative to the entire filter medium. Specifically, the proportion of the convex portions means a percentage of the total projected area of the plurality of convex portions in a case where the entire filter medium is projected in the air flow direction to the projected area of the entire filter medium in the case where the entire filter medium is projected in the air flow direction. When the convex portions include the first convex portions and the second convex portions, the projected area of the total of the first convex portions and the second convex portions is used for the calculation. When the proportion of the convex portions is set to 50% or more, the protrusion height of the convex portions required for sufficiently increasing the effective filter medium area can be suppressed to be small. Therefore, damage to the filter medium due to embossing is suppressed, which easily suppresses a decrease in the collection efficiency. Furthermore, when the proportion of the convex portions is set to 50% or more, the proportion of boundary portions between the convex portions and portions other than the convex portions can be reduced. Therefore, the deterioration of the performance of the filter medium which may occur in the boundary portions can be suppressed. Note that the entire surface of the air filter medium may be constituted by the first convex portions and the second convex portions.

The effective filter medium area proportion of the air filter medium is 110% or more and preferably 120% or more. When the effective filter medium area proportion is 110% or more, the pressure loss of the air filter medium is suppressed to be low, which easily improves the collection efficiency. From the viewpoint of suppressing the occurrence of damage to the air filter medium, the effective filter medium area proportion may be, for example, 300% or less and is preferably 220% or less. Herein, the "effective filter medium area proportion" means a proportion of the effective filter medium area of the air filter medium relative to the projected area of the entire air filter medium in the case where the entire filter medium is projected in the air flow direction.

The average protrusion ratio of the convex portions of the air filter medium is preferably 0.10 or more and 0.85 or less and more preferably 0.14 or more and 0.78 or less. When the average protrusion ratio is set to 0.10 or more, the effective filter medium area of the air filter medium can be easily increased. When the average protrusion ratio is set to 0.85 or less, the occurrence of damage to the air filter medium can be suppressed. Herein, the "average protrusion ratio" is an average value of the protrusion ratios of the plurality of convex portions. The protrusion ratio (mm/mm) refers to a ratio of the protrusion height (mm) of a convex portion in the air flow direction with respect to the equivalent diameter (mm) of a projected portion obtained by projecting the convex portion in the air flow direction. The protrusion height (mm) is a value excluding the thickness of the filter medium. The equivalent diameter (mm) is a value obtained by dividing four times the area (mm$^2$) of the projected portion obtained by projecting the convex portion in the air flow direction by the perimeter (mm) of the projected portion.

The average value of the protrusion heights of the convex portions in the air flow direction can be set to, for example, 1 mm or more and 8 mm or less while the thickness of the air filter medium is excluded.

The average value may be an average value of 100 convex portions present adjacent to each other.

When the air filter medium is viewed in the air flow direction, the number density (/cm$^2$) of the convex portions relative to the projected area of the entire filter medium is preferably 0.1 or more and 10 or less, may be 0.5 or more and 5 or less, and may be 1.0 or more and 4.0 or less from the viewpoint of easily increasing the effective filter medium area and easily suppressing the formation of locally thin portions due to stretching during embossing.

(5) Physical Properties of Air Filter Medium

The air filter medium preferably has a pressure loss of 160 Pa or less and more preferably 150 Pa or less given when air is passed through the air filter medium at a flow velocity of 9.63 cm/s. The pressure loss of the air filter medium given when air is passed at a flow velocity of 9.63 cm/s is not limited, but may be 40 Pa or more. The air filter medium preferably has a collection efficiency of 80% or more and more preferably 85% or more, as determined by using NaCl particles having a particle size of 0.075 μm while allowing air to pass through the air filter medium at a flow velocity of 9.63 cm/s.

The air filter medium preferably has a pressure loss of 80 Pa or less and more preferably 75 Pa or less given when air is passed through the air filter medium at a flow velocity of 5.3 cm/s. The pressure loss of the air filter medium given when air is passed at a flow velocity of 5.3 cm/s is not limited, but may be 20 Pa or more. The air filter medium preferably has a collection efficiency of 90% or more and more preferably 95% or more, as determined by using NaCl particles having a particle size of 0.3 μm while allowing air to pass through the air filter medium at a flow velocity of 5.3 cm/s.

For the air filter medium, a PF calculated from the formula $PF=\{-\log((100-\text{collection efficiency }(\%))/100)\}/(\text{pressure loss (Pa)}/1000)$ using the pressure loss given when air is passed at a flow velocity of 9.63 cm/s and the collection efficiency determined using NaCl particles having a particle size of 0.075 μm is preferably 10.2 or more and more preferably 11 or more.

For the air filter medium, a PF calculated from the formula $PF=\{-\log((100-\text{collection efficiency }(\%))/100)\}/(\text{pressure loss (Pa)}/1000)$ using the pressure loss given when air is passed at a flow velocity of 5.3 cm/s and the collection efficiency determined using NaCl particles having a particle size of 0.3 μm is preferably 38 or more, more preferably 39 or more, and further preferably 40 or more.

For the air filter medium, the dust-holding capacity for NaCl particles having a particle size of 0.1 μm is preferably 2.3 g/m$^2$ or more and more preferably 5.0 g/m$^2$ or more.

Each of the physical properties described in the present embodiment indicates a value in a non-charged state. Note that the air filter medium in a non-charged state refers to an air filter medium in a state in which electrification is not caused by being subjected to a static elimination treatment conforming to "JIS B 9908-4, Part 4: Test Method for Static Elimination Treatment of Ventilating Air Filter Unit".

The thickness of the air filter medium is, for example, preferably 200 μm or more and 500 μm or less. The thickness of the air filter medium is a thickness measured when a load of 0.3 N is imposed on a measurement target in a particular measuring instrument. The air filter medium of the present embodiment includes convex portions. For example, the thickness can be grasped as a value obtained by measuring, at a load of 0.3 N, the thickness of a plurality of air filter media stacked, measuring, at a load of 0.3 N, the thickness of air filter media on which a plurality of additional air filter media are stacked, and dividing the difference between the measured thicknesses by the number of the additional air filter media.

Preferably, the air filter medium does not include a crushed portion having 30% or less of the above-mentioned thickness, or an area proportion of the crushed portion is 1% or less as viewed in the air flow direction. More preferably, the air filter medium does not include a crushed portion having 20% or less of the above-mentioned thickness, or an area proportion of the crushed portion is 1% or less as viewed in the air flow direction. Even in the air filter medium that has been processed into an uneven shape, the formation of performance-reduced portions can be avoided by preventing or suppressing the formation of crushed portions.

In the case where the air filter medium is obtained by embossing a flat filter medium to form convex portions or an uneven shape, the PF ratio (PF after processing/PF before processing), which is a ratio of the PF of a filter medium after embossing to the PF of the flat filter medium, is preferably 1.1 or more and more preferably 1.2 or more. The PF herein is a PF obtained from the collection efficiency of dust having a particle size of 0.3 μm at an air flow velocity of 5.3 cm/s and the pressure loss given when air is passed at a flow velocity of 5.3 cm/s. Thus, by forming convex portions or an uneven shape in the air flow direction, the PF can be improved compared with filter media having a flat shape.

In the case where the main collection layer of the air filter medium is constituted by a single fibril-forming polytetrafluoroethylene, the PF of the air filter medium obtained from the collection efficiency of dust having a particle size of 0.3 μm at an air flow velocity of 5.3 cm/s and the pressure loss given when air is passed at a flow velocity of 5.3 cm/s is preferably 39 or more, more preferably 40 or more, and further preferably 41 or more.

In the case where the main collection layer of the air filter medium is constituted by a fibril-forming polytetrafluoroethylene, a non-fibril-forming non-melting-processable component, and a non-fibril-forming hot-melt-processable component having a melting point of lower than 320° C., the PF of the air filter medium obtained from the collection efficiency of dust having a particle size of 0.3 μm at an air flow velocity of 5.3 cm/s and the pressure loss given when air is passed at a flow velocity of 5.3 cm/s is preferably 38 or more, more preferably 39 or more, and further preferably 40 or more.

In the case where the main collection layer of the air filter medium contains one or more selected from the group consisting of polypropylene, polyvinylidene fluoride, polyethylene, polyester, polyamide, aromatic polyamide, polyacrylonitrile, polyvinyl chloride, polyurethane, polylactic acid, polyphenylene sulfide, and polyimide, the PF of the air filter medium obtained from the collection efficiency of dust having a particle size of 0.3 μm at an air flow velocity of 5.3 cm/s and the pressure loss given when air is passed at a flow velocity of 5.3 cm/s is preferably 22 or more, more preferably 23 or more, and further preferably 24 or more.

(6) Application of Air Filter Medium

The air filter medium of the present embodiment is not limited and is used, for example, in the following applications:
fields of, for example, ULPA filters (Ultra Low Penetration Air filters) (for producing semiconductors), HEPA filters (for hospitals and for producing semiconductors), cylindrical cartridge filters (for industrial use), bag filters (for industrial use), heat-resistant bag filters (for treating exhaust gas), heat-resistant pleated filters (for treating exhaust gas), SINBRAN (registered trademark) filters (for industrial use), catalyst filters (for treating exhaust gas), adsorbent-including filters (for installation in HDD), adsorbent-including vent filters (for installation in HDD), vent filters (e.g., for installation in HDD), filters for vacuum cleaners (for vacuum cleaners), general-purpose multilayered felt materials, cartridge filters for gas turbines (interchangeable components for gas turbines), and cooling filters (for casings of electronic devices);

fields of materials for freeze-drying such as freeze-drying bottles, automobile ventilation materials for electronic circuits and lamps, bottle applications such as bottle caps, protective ventilation for electronic devices, and ventilation/internal pressure regulation such as medical ventilation; and liquid filtration fields of, for example, semiconductor liquid filtration filters (for producing semiconductors), hydrophilic filters (for producing semiconductors), filters for chemicals (for treating chemical solutions), filters for pure water production lines (for producing pure water), and backwash liquid filtration filters (for treating industrial wastewater).

The air filter medium of the present embodiment may also be used as, for example, a mask for suppressing the entry of dust, oil smoke, bacteria, viruses, and the like into the human body through the mouth and nose. The form of the mask may be any of a flat type, a pleated type, and a three-dimensional type. The pleated mask may be used in a state in which a folded pleat portion is stretched out. The three-dimensional mask may have a beak shape that is tapered toward the front side.

(7) Air Filter Pack

Next, an air filter pack of the present embodiment will be described with reference to FIG. 7.

Figure 7:
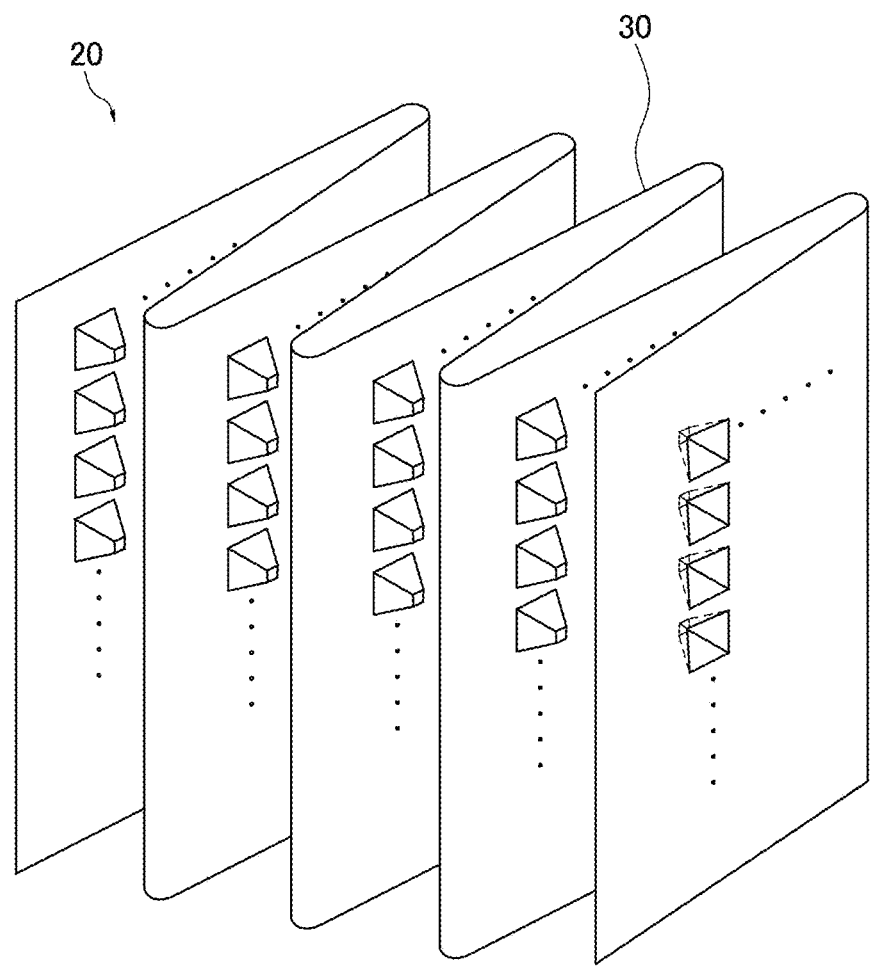
FIG. 7 is a schematic external perspective view of an air filter pack.

FIG. 7 is an external perspective view of an air filter pack 20 of the present embodiment.

The air filter pack 20 is a filter medium that has been processed (pleated) so as to have a zigzag shape in which mountain folds and valley folds are alternately repeated in the above-described air filter medium. The pleating can be performed using, for example, a publicly known rotary folding machine. The air filter pack obtained by performing pleating has a shape in which V-shapes are arranged when viewed in the folding direction of mountain folds and valley folds. The folding width of the filter medium is not limited, and is, for example, 25 mm or more and 280 mm or less. By performing pleating, the folding area of the filter medium can be increased in the case where the air filter pack 20 is used for an air filter unit. Thus, an air filter unit having high collection efficiency can be obtained. In this manner, in the folded air filter pack, the space between portions facing each other is ensured by the above-described convex portions of the air filter medium. In the air filter medium in which the plurality of convex portions are formed in an amount of 50% or more of the projected area of the entire filter medium, even when the air filter medium is used in a pleated shape under a relatively high wind velocity, the space between the portions facing each other on the leeward side is maintained, which easily suppresses deformation. Therefore, the pressure loss can be suppressed to be small.

In such a filter pack, it is preferable that a hot-melt resin or the like for maintaining the space between the portions facing each other of the air filter medium is not provided on the surface of the air filter medium, a stabilizer or the like for maintaining the space between the facing surfaces is not provided, and the space between the portions facing each other is ensured only by the above-described convex portions. In this case, since the hot-melt resin, the stabilizer, or the like is not required, the structural pressure loss can be suppressed to be small.

(8) Air Filter Unit

Next, an air filter unit 1 will be described with reference to FIG. 8.

Figure 8:
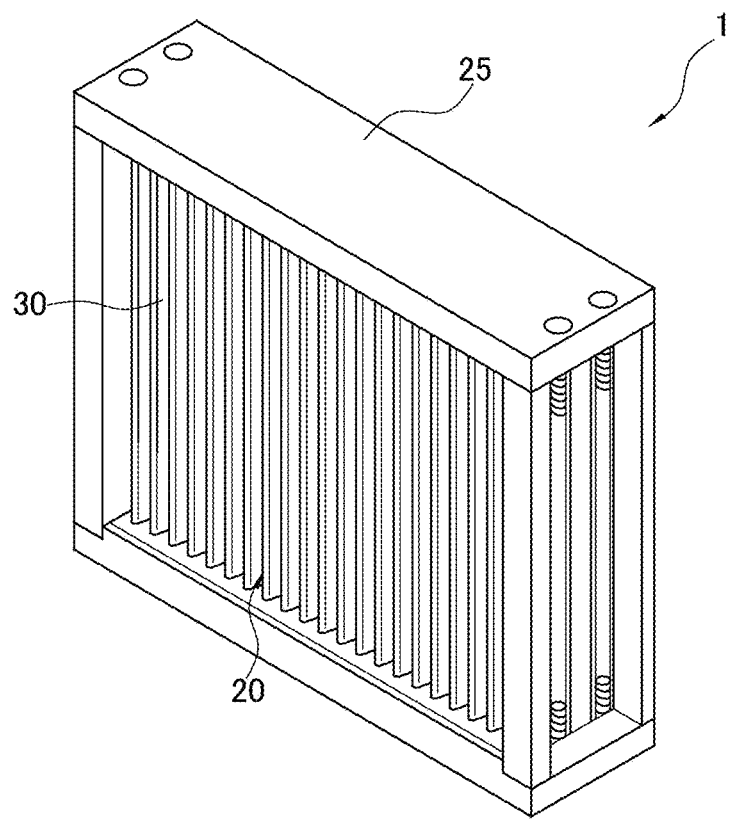
FIG. 8 is a schematic external perspective view of an air filter unit.

FIG. 8 is an external perspective view of the air filter unit 1 of the present embodiment.

The air filter unit 1 includes the above-described air filter pack 20 and a frame body 25 that houses the air filter pack 20.

The air filter unit preferably does not include a spacing member in order to suppress generation of dust due to friction caused by a difference in the degree of expansion caused by a change in temperature and to reduce the weight of the unit. Furthermore, since the spacing member is not used, damage to the air filter medium can be suppressed. An example of the spacing member is a separator that is a member independent of the air filter medium and configured to maintain the space between the portions facing each other of the air filter medium.

The frame body 25 is produced by, for example, assembling boards such as resin or metal boards, and the air filter pack 20 and the frame body 25 are preferably sealed with each other using a sealer. The sealer is used to prevent leakage between the air filter pack 20 and the frame body 25 and is formed of, for example, a resin such as an epoxy resin, an acrylic resin, or a urethane resin.

(9) Others

Herein, the "average protrusion ratio" is an average value of the protrusion ratios of the plurality of convex portions. The protrusion ratio refers to a ratio of the protrusion height of a convex portion in the air flow direction with respect to the equivalent diameter of a projected portion obtained by projecting the convex portion in the air flow direction. The equivalent diameter is a value obtained by dividing four times the area of the projected portion obtained by projecting the convex portion in the air flow direction by the perimeter of the projected portion.

Herein, the fluororesin may be a resin composed of a single component of a fibril-forming polytetrafluoroethylene.

EXAMPLES

Hereafter, the present disclosure will be specifically described based on Examples and Comparative Examples.

Comparative Example 1

The FP raw material for the fluororesin porous membrane used for the main collection layer of the air filter medium in Comparative Example 1 was a mixed powder constituted by three components (fibril-forming PTFE (A component), non-fibril-forming non-melting-processable component (B component), and non-fibril-forming hot-melt-processable component (C component) having a melting point of lower than 320° C.).

More specifically, 66.5 wt % (in terms of polymer) of a PTFE aqueous dispersion body (A component) having an SSG of 2.160 and prepared by the method described in Comparative Example 3 in International Publication No. 2005/061567, 28.5 wt % (in terms of polymer) of a low-molecular-weight PTFE aqueous dispersion body (B component) having a melt viscosity of 20000 Pa·s as measured by a flow tester method at 380° C. and prepared by the method described in International Publication No. 2009/020187, and 5 wt % (in terms of polymer) of an FEP aqueous dispersion body (C component) having a melting point of 215° C. and prepared by the method described in Japanese Unexamined Patent Application Publication No. 2010-235667 were mixed with each other. As a coagulant, 500 ml of a 1% aqueous aluminum nitrate solution was added thereto, and stirring was performed to cause co-coagulation. The resulting powder was strained through a strainer to remove water and then further dried in a hot-air drying furnace at 135° C. for 18 hours to obtain a mixed powder of the above three components.

Subsequently, 29.0 parts by weight (29.0 parts by weight relative to 100 parts by weight of the mixed powder) of a hydrocarbon oil ("IP Solvent 2028" manufactured by Idemitsu Kosan Co., Ltd.) serving as an extrusion liquid lubricant was added to and mixed with 100 parts by weight of the mixture at 20° C. Then, the resulting mixture was extruded using a paste extruder to obtain a round bar-shaped molded body. The round bar-shaped molded body was molded into a film using a calender roll heated to 70° C. to obtain a PTFE film. The resulting film was passed through a hot-air drying furnace at 250° C. to evaporate and remove the hydrocarbon oil, thereby obtaining a belt-shaped unbakedPTFE film (raw tape) having an average thickness of 300 μm and an average width of 150 mm. Subsequently, the unbakedPTFE film was drawn at a predetermined drawing speed (13.8%/s) in the longitudinal direction (MD direction) at a predetermined drawing ratio (10 times) in a predetermined temperature environment (250° C.). Subsequently, the drawn unbakedfilm was drawn at a predetermined drawing speed (330%/s) in the width direction (TD direction) at a predetermined drawing ratio (45 times) in a predetermined temperature environment (288° C.) using a tenter capable of clipping the drawn unbakedfilm, and was subjected to heat setting at 390° C. Thus, a fluororesin porous membrane was obtained.

An air filter medium of Comparative Example 1 obtained by thermally fusing a supporting layer to one surface of the fluororesin porous membrane obtained as described above. The supporting layer was a spun-bonded nonwoven fabric (average fiber diameter 24 μm, basis weight 40 g/m$^2$, thickness 0.2 mm) formed of fibers having a core/sheath structure in which PET was used for the core and PE was used for the sheath (the collection efficiency could be considered to be substantially zero or about zero).

Example 1

An air filter medium of Example 1 was obtained by embossing the air filter medium of Comparative Example 1 using an apparatus having a pair of roll-shaped embossing dies. The shape of protrusions provided on the embossing dies was a truncated quadrangular pyramid having a base side of 9.5 mm and a height of 5.5 mm, and the top side of the truncated quadrangular pyramid was 2.0 mm. One of the pair of roll-shaped embossing dies includes a plurality of protruding shapes for forming the plurality of first convex portions, and the other of the pair of roll-shaped embossing dies includes a plurality of concave shapes corresponding to the plurality of protruding shapes for forming the plurality of first convex portions. Similarly, the other of the pair of roll-shaped embossing dies includes a plurality of protruding shapes for forming the plurality of second convex portions, and the one of the pair of roll-shaped embossing dies includes a plurality of concave shapes corresponding to the plurality of protruding shapes for forming the plurality of second convex portions. The air filter medium of Example 1 was embossed using the embossing dies such that the proportion of the convex portions was 95%. Herein, the processing was performed using the pair of roll-shaped embossing dies heated to 80° C., which was a temperature higher than the glass transition temperature of nonwoven fabric fibers and equal to or lower than the temperature at which the nonwoven fabric was formed into a film.

Example 2

An air filter medium of Example 2 was obtained in the same manner as in Example 1, except that the same filter medium as in Comparative Example 1 was embossed using embossing dies such that the proportion of the convex portions was 50%, and the effective filter medium area proportion was changed accordingly.

Example 3

An air filter medium of Example 3 was obtained in the same manner as in Example 1, except that the same filter medium as in Comparative Example 1 was embossed using embossing dies such that the average protrusion ratio was 0.21, and the effective filter medium area proportion was changed accordingly.

Comparative Example 2

An air filter medium of Comparative Example 2 was obtained in the same manner as in Example 1, except that the same filter medium as in Comparative Example 1 was embossed using embossing dies having protruding shapes with a height of 9.0 mm such that the average protrusion ratio was 0.89, and the effective filter medium area proportion was changed accordingly. In Comparative Example 2, breakage was observed at the top of the convex portions.

Comparative Example 3

An air filter medium of Comparative Example 3 was obtained in the same manner as in Example 1, except that the same filter medium as in Comparative Example 1 was embossed using embossing dies such that the proportion of the convex portions was 40%.

Comparative Example 4

An air filter medium of Comparative Example 4 was obtained by embossing a nonwoven fabric made of glass fibers using the same roll-shaped embossing dies as in Example 3. The pressure loss and dust collection efficiency of the nonwoven fabric made of glass fibers before embossing were 275 Pa and 99.98%, respectively, when measured at a test wind velocity of 5.3 cm/s and a test particle size of 0.3 μm, resulting in PF=13. In Comparative Example 4, breakage was observed at the top of the convex portions.

Comparative Example 5

The FP raw material for the fluororesin porous membrane used for the main collection layer of the air filter medium in Comparative Example 5 was a mixed powder constituted by a single component.

More specifically, the FP raw material was prepared by mixing a predetermined amount (30 parts by weight) of an extrusion aid (liquid lubricant) with 100 parts by weight of a fine powder (manufactured by DAIKIN INDUSTRIES, Ltd., trade name: F106), homo-PTFE, of polytetrafluoroethylene having an average molecular weight of 6,500,000. Then, the resulting mixture was extruded using a paste extruder to obtain a round bar-shaped molded body. The round bar-shaped molded body was molded into a film using a calender roll heated to 70° C. to obtain a PTFE film. The resulting film was passed through a hot-air drying furnace at 200° C. to evaporate and remove the extrusion aid, thereby obtaining a belt-shaped unbakedPTFE film (raw tape) having a predetermined average thickness of 200 µm and an average width of 170 mm. Subsequently, the unbakedPTFE film was longitudinally drawn at a predetermined drawing speed of 29.5%/s in the longitudinal direction (MD direction) at a predetermined drawing ratio of 10 times at 300° C. using a heated three-roll drawing apparatus. Subsequently, the drawn film was horizontally drawn at a predetermined drawing speed (330%/s) in the width direction (TD direction) at a predetermined drawing ratio of 30 times in a predetermined temperature environment (290° C.) using a tenter continuous drawing apparatus capable of performing continuous clipping, and was subjected to heat setting at 390° C.

An air filter medium of Comparative Example 5 was obtained by, in the same manner as in Comparative Example 1, thermally fusing a supporting layer to one surface of the fluororesin porous membrane obtained as described above. The supporting layer was a spun-bonded nonwoven fabric (average fiber diameter 24 µm, basis weight 40 g/m², thickness 0.2 mm) formed of fibers having a core/sheath structure in which PET was used for the core and PE was used for the sheath (the collection efficiency could be considered to be substantially zero or about zero).

Example 4

An air filter medium of Example 4 was obtained by embossing the air filter medium of Comparative Example 5 using an apparatus having a pair of roll-shaped embossing dies so as to form the same shape as in Example 1. The air filter medium of Example 4 was embossed using embossing dies such that the proportion of the convex portions was 95% in the same manner as in Example 1.

Comparative Example 6

For an air filter medium of Comparative Example 6, a nanofiber membrane was obtained by an electrostatic spinning method using polypropylene. Specifically, a polypropylene resin (S315, manufactured by Prime Polymer Co., Ltd.) was melt-kneaded at 300° C. using a twin-screw extruder and subjected to electrostatic spinning. A nanofiber membrane having an average fiber diameter of 480 nm and a basis weight of 5.5 g/m² was obtained under spinning conditions that the inside diameter of a needle was 0.2 mm, the distance between collectors was 6 cm, and a voltage of 40 kV was applied to the needle.

An air filter medium of Comparative Example 6 was obtained by, in the same manner as in Comparative Example 1, thermally fusing a supporting layer to one surface of the nanofiber membrane obtained as described above. The supporting layer was a spun-bonded nonwoven fabric (average fiber diameter 24 µm, basis weight 40 g/m², thickness 0.2 mm) formed of fibers having a core/sheath structure in which PET was used for the core and PE was used for the sheath (the collection efficiency could be considered to be substantially zero or about zero).

Example 5

An air filter medium of Example 5 was obtained by embossing the air filter medium of Comparative Example 6 using an apparatus having a pair of roll-shaped embossing dies so as to form the same shape as in Example 1. The air filter medium of Example 5 was embossed using embossing dies such that the proportion of the convex portions was 95% in the same manner as in Example 1.

The physical properties measured in Examples 1 to 5 and Comparative Examples 1 to 6 are as follows.

Proportion of Convex Portions

The proportion of convex portions, which is a percentage of convex portions obtained when the air filter medium is projected in the air flow direction, was calculated from the following formula.

Proportion of convex portions (%) =

(the total projected area of plurality of convex portions in the case where the entire filter medium is projected in the air flow direction/ the projected area of the entire filter medium in the case where the entire filter medium is projected in the air flow direction)×100

Effective Filter Medium Area Proportion

The effective filter medium area proportion, which is a percentage of the effective filter medium area of an air filter medium having convex portions to the effective filter medium area in the case of assuming that there was no convex portion, was calculated from the following formula. The effective filter medium area of the air filter medium refers to a total surface area of the air filter medium on the windward side.

Effective filter medium area proportion (%) =

(effective filter medium area of the air filter medium/ projected area of the entire air filter medium in the case where the entire filter medium is projected in the air flow direction)×100

Average Protrusion Ratio

The average protrusion ratio, which is an average value of protrusion ratios of freely selected 100 convex portions located adjacent to each other, was calculated. As described below, the protrusion ratio was defined as a ratio of the height excluding the thickness of the convex portion to the equivalent diameter of the convex portion. The equivalent diameter (mm) is obtained by dividing four times the area (mm²) of the bottom surface, which is a projected portion of the convex portion in the air flow direction, by the perimeter (mm) of the convex portion. For example, when the bottom surface of the convex portion is a square, the equivalent diameter (mm) represents the length of one side of the square.

Protrusion ratio (mm/mm) = protrusion height (mm) of convex portion/
    equivalent diameter (mm) of convex portion Equivalent diameter (mm²/mm) =
    four times the area (mm²) of bottom surface of convex portion/
    perimeter (mm) of bottom surface of convex portion

Pressure Loss of Air Filter Medium at Test Wind Velocity of 9.63 cm/s

A measurement sample of the air filter medium was set to a filter medium holder having a size of 65 cm². The pressure on the inlet side was increased using a compressor, and the flow velocity of air passing through the air filter medium was adjusted to 9.63 cm/s using a velocimeter. The pressure loss at this time was measured using a differential pressure gauge.

Pressure Loss of Air Filter Medium at Test Wind Velocity of 5.3 cm/s

A measurement sample of the air filter medium was set to a filter medium holder having a size of 65 cm². The pressure on the inlet side was increased using a compressor, and the flow velocity of air passing through the air filter medium was adjusted to 5.3 cm/s using a velocimeter. The pressure loss at this time was measured using a differential pressure gauge.

Collection Efficiency of Air Filter Medium Using NaCl Particles Having Particle Size of 0.075 µm NaCl particles generated with an atomizer in conformity to the NaCl aerosol generating method (pressurized atomizing method) in JIS B9928 Appendix 5 (specification) were classified using an electrostatic classifier (manufactured by TSI Incorporated) into particles having a particle size of 0.075 µm. The charge on the particles was neutralized using americium-241. Then, the flow velocity at which the particles passed through the air filter medium was adjusted to 9.63 cm/s. The numbers of particles before and after passage through the filter medium serving as a measurement sample were determined using a particle counter (CNC manufactured by TSI Incorporated), and the collection efficiency was calculated from the following formula.

Permeability (%) = $(CO/CI) \times 100$

Collection efficiency (%) = 100 − permeability (%)

$CO$ = Number of 0.075 µm NaCl particles
    on the downstream side of the measurement sample $CI$ = Number of 0.075 µm NaCl particles
    on the upstream side of the measurement sample

Collection Efficiency of Air Filter Medium Using NaCl Particles Having Particle Size of 0.3 µm NaCl particles generated with an atomizer in conformity to the NaCl aerosol generating method (pressurized atomizing method) in JIS B9928 Appendix 5 (specification) were classified using an electrostatic classifier (manufactured by TSI Incorporated) into particles having a particle size of 0.3 µm. The charge on the particles was neutralized using americium-241. Then, the flow velocity at which the particles passed through the air filter medium was adjusted to 5.3 cm/s. The numbers of particles before and after passage through the filter medium serving as a measurement sample were determined using a particle counter (CNC manufactured by TSI Incorporated), and the collection efficiency was calculated from the following formula.

Permeability (%) = $(CO/CI) \times 100$

Collection efficiency (%) = 100 − permeability (%)

$CO$ = Number of 0.3 µm NaCl particles
    on the downstream side of the measurement sample $CI$ = Number of 0.3 µm NaCl particles
    on the upstream side of the measurement sample

PF of Air Filter Medium Using NaCl Particles Having Particle Size of 0.075 µm The PF was determined based on the following formula from the pressure loss of the air filter medium at a test wind velocity of 9.63 cm/s and the collection efficiency of the air filter medium using the NaCl particles having a particle size of 0.075 µm.

$PF = \{-\log((100 - \text{collection efficiency } (\%))/100)\}/$
    (pressure loss (Pa)/1000)

PF of Air Filter Medium Using NaCl Particles Having Particle Size of 0.3 µm

The PF was determined based on the following formula from the pressure loss of the air filter medium at a test wind velocity of 5.3 cm/s and the collection efficiency of the air filter medium using the NaCl particles having a particle size of 0.3 µm.

$PF = \{-\log((100 - \text{collection efficiency } (\%))/100)\}/$
    (pressure loss (Pa)/1000)

Dust-Holding Capacity of Air Filter Medium Using NaCl Particles Having Particle Size of 0.1 μm Evaluation was performed by a pressure loss-increase test in which NaCl particles (solid particles) were passed. That is, the pressure loss given when air containing NaCl particles was continuously passed through a sample filter medium having an effective filtration area of 50 cm² at a flow velocity of 5.3 cm/s was measured over time using a differential pressure gauge to determine a dust-holding capacity (g/m²) that was a weight of NaCl particles held in the filter medium per unit area of the filter medium when the pressure loss reached 300 Pa. The NaCl particles were NaCl particles (number median diameter: 0.1 μm) generated with an atomizer, and the concentration of the NaCl particles was set to about 5,000,000 to 7,000,000/cm³. The dust-holding capacity of NaCl particles having a particle size of 0.1 μm in the air filter medium was measured only for the air filter media in Examples 1 and 3 and Comparative Example 1. The dust-holding capacity of NaCl particles having a particle size of 0.1 μm in the air filter medium was 6.8 g/m² in Example 1, 2.4 g/m² in Example 3, and 2.2 g/m² in Comparative Example 1.

The physical properties of the air filter media in Examples 1 to 5 and Comparative Examples 1 to 6 are shown in Tables below.

TABLE 1

| | | | Example 1 | Example 2 | Example 3 | Comparative Example 1 | Comparative Example 2 | Comparative Example 3 | Comparative example 4 |
|---|---|---|---|---|---|---|---|---|---|
| Structure of filter medium | Main collection layer | | PTFE | PTFE | PTFE | PTFE | PTFE | PTFE | Glass |
| | Supporting layer | | PET/PE-SB | PET/PE-SB | PET/PE-SB | PET/PE-SB | PET/PE-SB | PET/PE-SB | — |
| Proportion of convex portions | | % | 95 | 50 | 95 | 0 | 95 | 40 | 95 |
| Effective filter medium area proportion | | % | 190 | 140 | 120 | 100 | — | 138 | — |
| Average protrusion ratio | | mm/mm | 0.53 | 0.53 | 0.21 | — | 0.89 | 0.53 | 0.21 |
| Test wind velocity 9.63 cm/s | Pressure loss | Pa | 53.2 | 69.0 | 70.9 | 75.0 | — | 70.0 | — |
| | Collection efficiency @0.075 um | % | 86.5 | 83.0 | 83.0 | 83 | Breakage | 75 | Breakage |
| | PF | | 16.0 | 10.9 | 10.6 | 10.1 | — | 8 | — |
| Test wind velocity 5.3 cm/s | Pressure loss | Pa | 26.1 | 34.0 | 35.0 | 36.7 | — | 40 | — |
| | Collection efficiency @0.3 um | % | 95.5 | 96.0 | 96.0 | 96.1 | — | 96 | — |
| | PF | | 50.6 | 40.3 | 39.1 | 37.7 | — | 34 | — |

TABLE 2

| | | | Example 4 | Comparative Example 5 | Example 5 | Comparative example 6 |
|---|---|---|---|---|---|---|
| Structure of filter medium | Main collection layer | | PTFE single component | PTFE single component | PP | PP |
| | Supporting layer | | PET/PE-SB | PET/PE-SB | PET/PE-SB | PET/PE-SB |
| Proportion of convex portions | | % | 95 | 0 | 95 | 0 |
| Effective filter medium area proportion | | % | 190 | 100 | 190 | 100 |
| Average protrusion ratio | | mm/mm | 0.53 | — | 0.53 | — |
| Test wind velocity 9.63 cm/s | Pressure loss | Pa | — | — | — | — |
| | Collection efficiency @0.075 um | % | — | — | — | — |
| | PF | | — | — | — | — |
| Test wind velocity 5.3 cm/s | Pressure loss | Pa | 87.3 | 120.2 | 17.9 | 23.5 |
| | Collection efficiency @0.3 um | % | 99.995 | 99.998 | 67.8 | 68.8 |
| | PF | | 48.1 | 38.8 | 26.9 | 21.1 |

In particular, as shown in Tables 1 and 2, the PF values in Examples 1, 4, and 5 in which the convex portions were formed were better than those in Comparative Examples 1, 5, and 6 in which flat filter media were used. According to the ratios of the PFs before and after the processing of the convex portions (PF in Example 1/PF in Comparative Example 1=1.34, PF in Example 4/PF in Comparative Example 5-1.24, and PF in Example 5/PF in Comparative Example 6=1.27), it was confirmed that the PFs were improved to the same extent.

The embodiments of the present disclosure have been described, but it should be understood that the configurations and details can be modified in various ways without departing from the spirit and scope of the present disclosure as defined in the claims.

REFERENCE SIGNS LIST 1 air filter unit
20 air filter pack
25 frame body
30 air filter medium
31 main collection layer
32 supporting layer

CITATION LIST

Patent Literature

PTL 1: International Publication No. 2019/159654

The invention claimed is:

1. An air filter medium including a resin including a fluororesin, comprising:
    a plurality of convex portions protruding in an air flow direction,
    wherein a projected area of the plurality of convex portions in a case where an entirety of the filter medium is projected in the air flow direction is 50% or more and 100% or less of a projected area of the entirety of the filter medium in the case where the entirety of the filter medium is projected in the air flow direction, and
    a proportion of an effective filter medium area of the filter medium to the projected area of the entirety of the filter medium in the case where the entirety of the filter medium is projected in the air flow direction is 110% or more,
    wherein the plurality of convex portions include a plurality of first convex portions protruding toward an upstream side in the air flow direction with respect to the filter medium and a plurality of second convex portions protruding toward a downstream side in the air flow direction with respect to the filter medium,
    a total projected area of the plurality of first convex portions and the plurality of second convex portions in the case where the entirety of the filter medium is projected in the air flow direction is 50% or more and 100% or less of a projected area of the entirety of the filter medium in the case where the entirety of the filter medium is projected in the air flow direction, and
    a proportion of an effective filter medium area of the filter medium to the projected area of the entirety of the filter medium in the case where the entirety of the filter medium is projected in the air flow direction is 110% or more.

2. The air filter medium according to claim 1,
    wherein a PF obtained from a collection efficiency of dust having a particle size of 0.075 μm at an air flow velocity of 9.63 cm/s and a pressure loss given when air is passed at a flow velocity of 9.63 cm/s 10.2 or more.

3. The air filter medium according to claim 1,
    wherein an average protrusion ratio of the plurality of convex portions in the air flow direction is 0.10 or more and 0.85 or less.

4. The air filter medium according to claim 1,
    wherein the fluororesin includes a fibril-forming polytetrafluoroethylene, and
    a PF obtained from a collection efficiency of dust having a particle size of 0.3 μm at an air flow velocity of 5.3 cm/s and a pressure loss given when air is passed at a flow velocity of 5.3 cm/s is 39 or more.

5. The air filter medium according to claim 1,
    wherein the fluororesin includes a fibril-forming polytetrafluoroethylene, a non-fibril-forming non-melting-processable component, and a non-fibril-forming hot-melt-processable component having a melting point of lower than 320° C., and
    a PF obtained from a collection efficiency of dust having a particle size of 0.3 μm at an air flow velocity of 5.3 cm/s and a pressure loss given when air is passed at a flow velocity of 5.3 cm/s is 38 or more.

6. The air filter medium according to claim 1,
    wherein the plurality of convex portions are present in a dot pattern.

7. The air filter medium according to claim 6,
    wherein the first convex portions are each surrounded by three or more of the second convex portions, and
    the second convex portions are each surrounded by three or more of the first convex portions,
    the plurality of first convex portions includes a predetermined first convex portion and a most proximate first convex portion located closest to the predetermined first convex portion, the plurality of second convex portions includes three or more predetermined second convex portions located closer to the predetermined first convex portion than the most proximate first convex portion, or
    the plurality of second convex portions includes a predetermined second convex portion and a most proximate second convex portion located closest to the predetermined second convex portion, the plurality of first convex portions includes three or more predetermined first convex portions located closer to the predetermined second convex portion than the most proximate second convex portion.

8. The air filter medium according to claim 1,
    wherein the plurality of first convex portions and the plurality of second convex portions are all stripe-shaped convex portions, and
    the first convex portions and the second convex portions are alternately arranged.

9. The air filter medium according to claim 1,
    wherein the first convex portions and the second convex portions are continuous.

10. The air filter medium according to claim 1,
    wherein the plurality of convex portions are stretch-formed portions obtained by being extruded in the air flow direction.

11. The air filter medium according to claim 10,
    wherein the filter medium is obtained by processing a flat filter medium such that the stretch-formed portions are produced by performing extrusion in a thickness direction of the flat filter medium,
    a PF ratio (PF after processing/PF before processing), which is a ratio of a PF of the filter medium in which the stretch-formed portions are produced to a PF of the flat filter medium, is 1.1 or more, and the PF is obtained from a collection efficiency of dust having a particle size of 0.3 μm at an air flow velocity of 5.3 cm/s and a pressure loss given when air is passed at a flow velocity of 5.3 cm/s.

12. An air filter pack comprising:

the air filter medium according to claim 1, wherein the air filter medium is processed so as to have a zigzag shape in which mountain folds and valley folds are alternately repeated, and the plurality of convex portions maintain spaces between portions facing each other in the air filter medium.

13. An air filter unit comprising:

the air filter pack according to claim 12; and a frame body that holds the air filter pack.

14. The air filter medium according to claim 2, wherein an average protrusion ratio of the plurality of convex portions in the air flow direction is 0.10 or more and 0.85 or less.

15. The air filter medium according to claim 2, wherein the fluororesin includes a fibril-forming polytetrafluoroethylene, and a PF obtained from a collection efficiency of dust having a particle size of 0.3 μm at an air flow velocity of 5.3 cm/s and a pressure loss given when air is passed at a flow velocity of 5.3 cm/s is 39 or more.

16. The air filter medium according to claim 2, wherein the fluororesin includes a fibril-forming polytetrafluoroethylene, a non-fibril-forming non-melting-processable component, and a non-fibril-forming hot-melt-processable component having a melting point of lower than 320° C., and a PF obtained from a collection efficiency of dust having a particle size of 0.3 μm at an air flow velocity of 5.3 cm/s and a pressure loss given when air is passed at a flow velocity of 5.3 cm/s is 38 or more.

17. The air filter medium according to claim 2, wherein the plurality of convex portions are present in a dot pattern.

18. The air filter medium according to claim 2, wherein the plurality of first convex portions and the plurality of second convex portions are all stripe-shaped convex portions, and the first convex portions and the second convex portions are alternately arranged.

19. The air filter medium according to claim 2, wherein the first convex portions and the second convex portions are continuous.

20. The air filter medium according to claim 2, wherein the plurality of convex portions are stretch-formed portions obtained by being extruded in the air flow direction.

* * * * *